United States Patent [19]

vander Griendt et al.

[11] Patent Number: 4,892,184

[45] Date of Patent: Jan. 9, 1990

[54] INFEED SYSTEM FOR CONTAINER DECORATING APPARATUS

[75] Inventors: Pieter S. vander Griendt, Bernardsville, N.J.; Robert W. Tielrooy, Amstelveen, Netherlands; Edward J. Russell, Gladwin, Mich.

[73] Assignee: Van Dam Machine Corporation, West Paterson, N.J.

[21] Appl. No.: 263,809

[22] Filed: May 15, 1981

[51] Int. Cl.[4] .............................................. B65G 47/84

[52] U.S. Cl. ................................ 198/476.1; 198/487.1

[58] Field of Search ............... 198/476, 478, 480, 651, 198/487.1, 803.12, 476.1; 101/40, 39, 38 A

[56] References Cited

U.S. PATENT DOCUMENTS

| | | | |
|---|---|---|---|
| 3,563,170 | 2/1971 | Cvacho et al. | 198/480 |
| 3,996,851 | 12/1976 | Urban | 101/40 |
| 4,140,053 | 2/1977 | Skrypek et al. | 101/40 |
| 4,337,719 | 7/1982 | vander Griendt et al. | 101/40 |

*Primary Examiner*—Robert J. Spar
*Assistant Examiner*—D. Glenn Dayoan
*Attorney, Agent, or Firm*—Klauber & Jackson

[57] ABSTRACT

An infeed transfer system for a continuously operated container decorating apparatus comprises a mandrel wheel assembly having a rotating mandrel wheel, a plurality of regularly spaced mandrel assemblies pivotally mounted thereon, and a box cam spaced-apart from the mandrel wheel and communicating with one end of the mandrel assemblies, to guide the path of movement of the mandrel assemblies during the rotation of the mandrel wheel. A pocket wheel is rotatably mounted and is axially displaced from the mandrel wheel. The pocket wheel has a diameter smaller than that of the mandrel wheel and the box cam defines an undulating path that causes each of the mandrel assemblies to follow the circumferential periphery of the pocket wheel, in alignment with consecutive cradles defined by the pocket wheel, and such alignment continues through an arc of rotation. The box cam defines a box cam track having an undulating path that corresponds in curvature to an arcuate portion of the outer circumference of the pocket wheel. The reduction in size of the pocket wheel facilitates access for maintenance and operation of the mandrel assembly, and makes it easier for the mandrels to discharge misfed containers.

7 Claims, 5 Drawing Sheets

INFEED SYSTEM FOR CONTAINER DECORATING APPARATUS

BACKGROUND OF THE INVENTION

1. Field of the Invention

This invention relates to a machine for applying a finish to the exterior surfaces of containers, such as cylindrical cans, and, in particular, relates to a high speed machine capable of applying such finishes or "decorations".

2. Description of the Prior Art

In general, a variety of machines for applying decorative finishes to containers such as cans and the like are known and comprise an infeed system that transports the cans to a positioning unit that receives the cans and moves them into position for transfer to corresponding mandrels located on an axially adjacent mandrel wheel. After receiving the cans, the mandrels are moved into position for the printing operation, where a printing blanket is brought into contact with each of the containers, to place an outer decoration thereon. Thereafter, the mandrels bearing their containers are moved to a varnishing station where an outer coat of varnish is applied to finish the decoration of the containers.

The infeed systems of the prior art have utilized some form of star wheel assembly, including an upper star wheel and a lower pocket wheel, each provided with symmetrical cradles adapted to define at the tangent point an enclosure for the incoming containers. The decorating machines presently known and in operation utilize a lower pocket wheel that generally corresponds in diameter to the mandrel wheel, and the number of cradles has correspondingly been equal to the number of mandrels mounted on the mandrel wheel.

While this construction has simplified the initial manufacturing of the machine, in that the pocket wheel may be mounted on the same axis of rotation and may therefore be driven at the same speed as the mandrel wheel, the size of the pocket wheel makes it difficult to access the mandrel wheel assembly in the instance where servicing is required. In the event, for example, that a misfeed of a container occurs, the disposition of the pocket wheel adjacent each of the mandrels, renders it difficult for the mandrel to move the misfed container.

SUMMARY OF THE INVENTION

In accordance with the present invention an apparatus for the continuous decorative coating of containers is disclosed which comprises an infeed system for receiving and serially moving the containers, a mandrel wheel assembly comprising a rotatable mandrel wheel bearing a plurality of circumferentially disposed mandrel assemblies for retaining the containers, one or more coating stations comprising a first printing station and a second varnishing station, disposed circumfentially adjacent the mandrel wheel assembly, and a takeoff system that is located adjacent the mandrel assembly and radially displaced with respect to the coating stations, adapted to transport the containers away from the coating stations, wherein the infeed system includes the mandrel wheel, a plurality of regularly spaced mandrel assemblies mounted pivotally thereon, a box cam guide means communicating with said mandrel assemblies, and a rotatable pocket wheel mounted in axial displacement from the mounted wheel. The pocket wheel tangentially cooperates with an upper star wheel. The star wheel and pocket wheel rotate in opposite directions to each other and are synchronized so that their cradles cooperate to receive and hold the containers for pickup by the mandrel assemblies. The mandrel assemblies are adapted by the box cam guide means to move through an arc of axial alignment with the rotation of the pocket wheel, to permit the mandrel assemblies to pick up the containers.

In the present invention, the pocket wheel is reduced in size, and possesses a diameter less than that of the mandrel wheel. Preferably, the pocket wheel has a diameter equal to the radius of the mandrel wheel, and is adapted to rotate at a speed with respect to the mandrel wheel sufficient to enable corresponding consecutive cradles and mandrels to move through alignment with each other.

The box cam guide means comprises a generally circular box cam track that receives the cam roller ends of the mandrel assemblies. The box cam track defines an undulation that is axially aligned with a portion of the circumferential periphery of the pocket wheel within an arc of rotation so that the mandrel assemblies move in alignment with the pocket wheel for an arcuate distance sufficient to facilitate container transfer to occur smoothly at high operating speeds.

The pocket wheel may be supported within a cage comprising a generally rectangular face plate defining circular openings therewithin for the reception of its axis of rotation. The remainder of the cage is comprised of a main support panel of the apparatus and one or more struts that extend from the main support panel to the upper portion of the face plate.

The rotation of the pocket wheel is governed by a transmission assembly which may comprise a drive connection between the mandrel assembly and the pocket wheel.

The reduced size and area assumed by the pocket wheel of the present invention greatly simplifies the inspection and maintenance of the container decorating apparatus in operation. Likewise, misfed containers are easily removed.

Accordingly, it is a principal object of the present invention to provide an infeed system for use with a container decorating apparatus which utilizes a reduced diameter pocket wheel.

It is a further object of the present invention to provide an infeed system as aforesaid which simplifies maintenance and repair of the container decorating apparatus.

It is a yet further object of the present invention to provide an infeed system as aforesaid which is of simplified construction.

Other objects and advantages will become apparent to those skilled in the art from a consideration of the ensuing specification which proceeds with reference to the following illustrative drawings.

DETAILED DESCRIPTION

The present invention comprises an infeed system for an apparatus with a continuous decoration of containers. A representative apparatus is shown in FIG. 1 and designated 10 therein.

Figure 1:
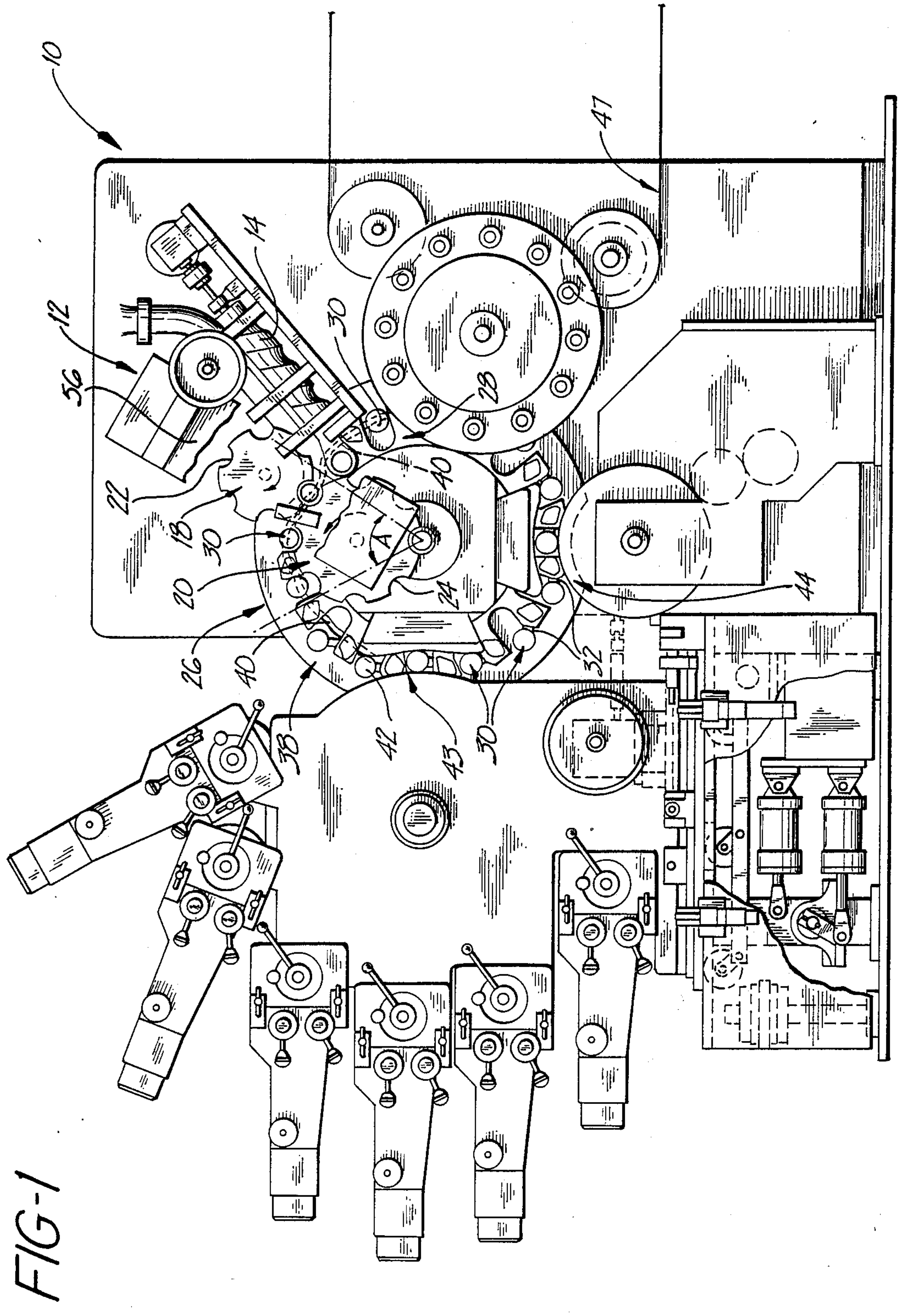
FIG. 1 is a front elevational view partly in phantom of a container decorating apparatus in accordance with the present invention.

Referring to FIG. 1, container decorating apparatus 10 comprises an infeed system 12 including a feed screw 14 that initially transports the incoming containers to a star wheel assembly 16, comprising an upper star wheel 18 and a lower pocket wheel 20. Star wheel 18 and pocket wheel 20 define corresponding cradles 22 and 24, respectively, that are adapted to cooperate to define a receptacle to transport the incoming containers. Star wheel 18 and pocket wheel 20 rotate in opposite directions in tangential proximity for this purpose.

Figure 2:
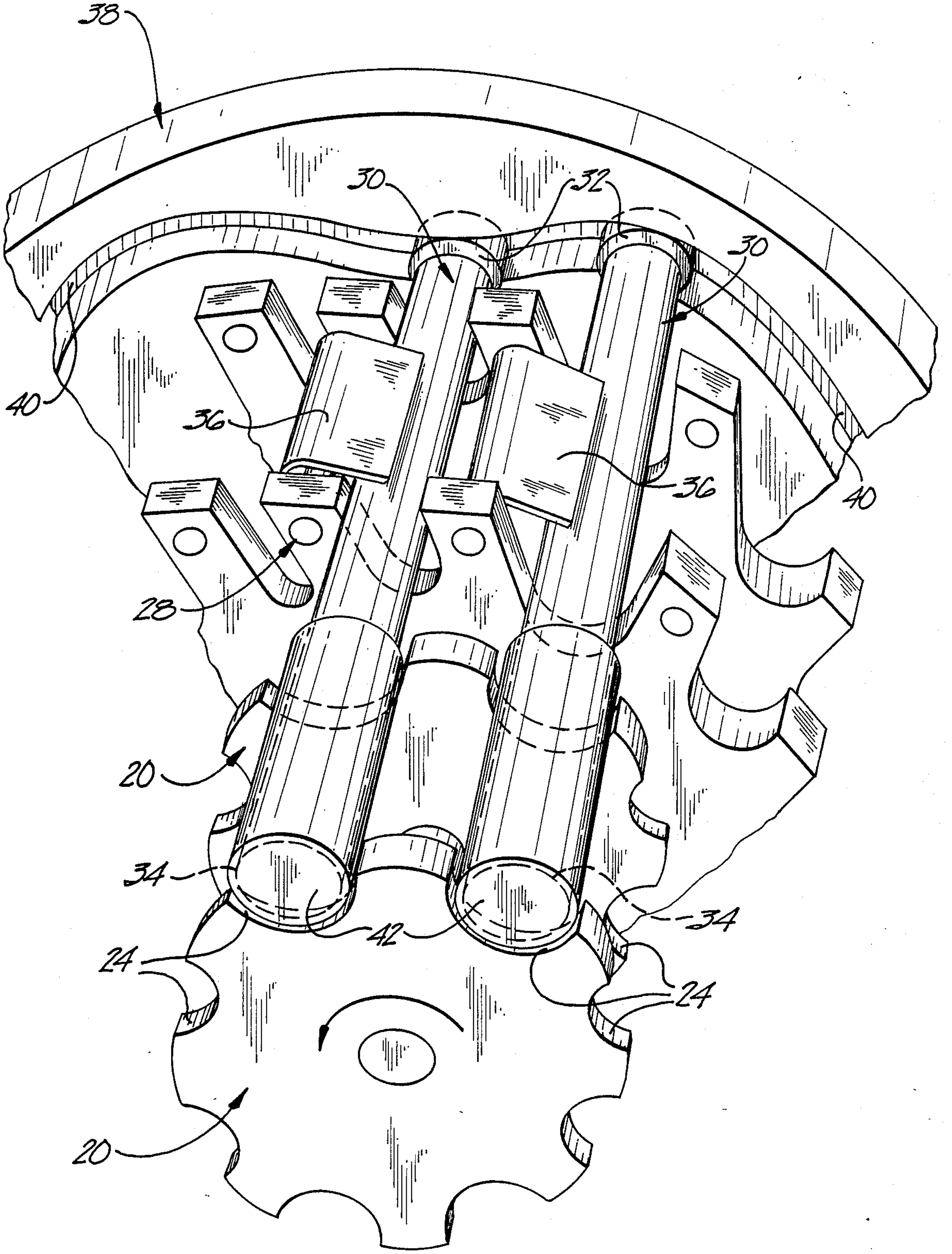
FIG. 2 is an enlarged fragmentary perspective view, further illustrating the infeed system of the present invention.

A mandrel wheel assembly 26 is axially spaced-apart from star wheel assembly 16 and is adapted to cooperate therewith to pick up the incoming containers. Mandrel wheel assembly 26 comprises a rotatable mandrel wheel 28 that supports a plurality of mandrel assemblies 30. Referring briefly to FIG. 2, mandrel assemblies 30 are essentially cylindrical and as illustrated extend transversely away from mandrel wheel 28 in both directions. Mandrel assemblies 30 define cam roller ends 32 at one end, and container receiving mandrels 34 at the opposite end thereof. Mandrel assemblies 30 are pivotally mounted on mandrel wheel 28 by mandrel arms 36, that enable mandrel assemblies 30 to move radially with respect to mandrel wheel 28 during the operation of apparatus 10. Cam roller ends 32 communicate with a box cam guide means 38. Guide means 38 comprises a planar, stationary box cam mounted axially spaced-apart from mandrel wheel 28, with a continuous box cam track 40 defined in one of its broad surfaces. Box cam track 40 receives the cam roller end 32 of mandrel assemblies 30, and thereby defines the path of movement of mandrel assemblies during the rotation of the mandrel wheel 28.

In the infeed system of the present invention the pocket wheel 20 has a smaller diameter than that of mandrel wheel 28. Preferably, and as illustrated in the Figures, pocket wheel 20 may have a diameter approximately 50% less than that of mandrel wheel 28, for the advantages noted earlier, of ease of access to the mandrel assemblies 30, to facilitate repair and to facilitate ease of misfeed "blow-off", the latter necessary in the instance where a container is improperly mounted on a particular mandrel.

In the preferred embodiment, illustrated best in FIG. 1, pocket wheel 20 defines eight cradles 24, which is approximately one-half the number of mandrel assemblies 30 mounted upon mandrel wheel 28. Pocket wheel 20 therefore is adapted to rotate at a speed sufficient to enable consecutive pocket wheel cradles 24 to align with corresponding consecutive mandrel assemblies 30, and such speed of rotation is generally two times that of the speed of rotation of mandrel wheel 28. Star wheel 18 is likewise adjusted so that its rate of rotation is related to pocket wheel 20, so that respective cradles 22 and 24 consecutively pass through juxtaposed alignment with each other to define the receptacles for the support and transfer of the incoming containers. The exact manner in which the respective speeds of rotation of each of the wheels is set, is not critical, and various transmission means may be utilized all within the scope of the present invention. For example, the pocket wheel may be governed by a transmission assembly that comprises a drive connection between it and the mandrel assembly, so that the pocket wheel rotates at a set ratio with reference to the mandrel wheel, and pocket wheel cradles 24 and the mandrel assemblies 30 pass through alignment with each other.

It is one of the features of the present invention that despite the reduced size of the pocket wheel 20, the mandrel assemblies 30 are able to follow the path of rotation of the circumferential periphery of the pocket wheel for a period of time sufficient to facilitate the transfer of containers from cradles 24 to mandrels 34 at the high speeds of operation of apparatus 10. Thus, merely aligning the orbits of the mandrel 34 and pocket wheel cradles 24 at a single tangent point, would be inadequate and would provide insufficient dwell time of alignment to assure proper transfer at high operating speeds.

Accordingly, the box cam guide means of the present invention provides an undulation in the box cam track 40 that causes the mandrel assemblies 30 to move through an arcuate path of rotation that is in axial alignment with a corresponding path followed by the circumferential periphery of pocket wheel 20, so that at least two consecutive pocket wheel cradles 24 are always in axial alignment with the corresponding consecutive mandrel assemblies 30 within this arc of rotation.

FIG. 2 illustrates in greater detail the undulation or deflection of box cam track 40. The mandrel assemblies 30 as illustrated, are in axial alignment with corresponding consecutive pocket wheel cradles 24, and are thereby in position to pick up containers 42. The arcs of rotation of mandrel assemblies and pocket wheel cradles 24 may preferably be subtended by acute angle A shown in FIG. 1, taken with reference to the axis of rotation of mandrel wheel 28. In the illustration, rotation of both the mandrel wheel 28 and the pocket wheel 20 is counterclockwise, so the lefthand most mandrel assembly 30 has completed its residence in alignment with its corresponding pocket wheel cradle 24, and is now prepared to move away from pocket wheel 20 bearing the container 42 securely thereon. The path of box cam track 40 can be seen at this point to be moving radially outward with respect to the axis of rotation of mandrel wheel 28, and mandrel assemblies 30 may follow this movement by pivoting radially outward on mandrel arms 36.

While FIG. 2 illustrates the alignment of two mandrel assemblies 30, the arc of rotation subtended by the angle A could include as many as three consecutive mandrel assemblies 30, as suggested by FIG. 1. The exact configuration of the undulation of box cam track 40 may thus vary within the scope of the present invention, and may be defined by an acute angle, i.e. an angle of 90° or less.

Figure 3:
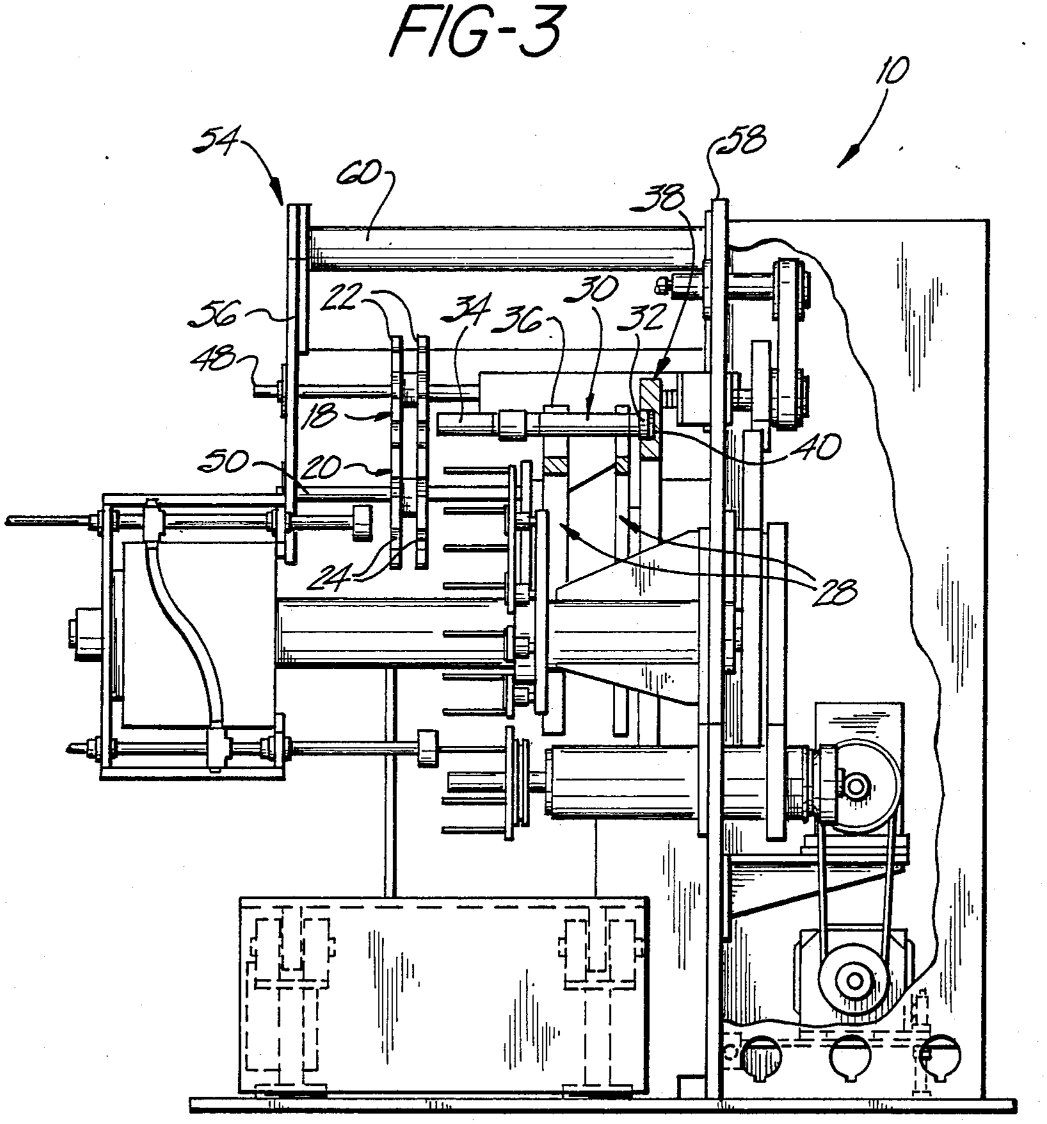
FIG. 3 is a partly fragmentary side view showing the infeed system of the present invention.

FIG. 3 illustrates a fragmentary side view of input system 12. Star wheel 18 and pocket wheel 20 reside in the same vertical plane, and parallel to the plane of mandrel wheel 28. Mandrel assembly 30 has just moved out of alignment with a receptacle, not shown, and now bears a container 42. Star wheel 18 and pocket wheel 20 are supported upon respective shafts 48 and 50 which extend in the direction of mandrel wheel 28 to communicate with a transmission assembly, shown schematically, that provides them with rotational movement.

As indicated earlier, a transmission assembly may be provided to provide rotational movement for pocket wheel 20, either independently or in concert with the mandrel wheel assembly 26. Referring further to FIG. 3, pocket wheel shaft 50 extends in the direction of mandrel wheel 28, and may, in a manner not shown, such as by a belt and pulley drive, gear and sprocket drive, or other known expedient, translate rotational movement from the drive shaft of mandrel wheel 28, to the shaft of the pocket wheel. As stated earlier, the exact ratio of rotation can be pre-set by known means, and does not per se form a part of the present invention.

A supporting cage 54 may be provided as shown in FIGS. 1 and 3 to support star wheel assembly 16. In FIG. 1, supporting cage 54 is seen to comprise a face plate 56 that shrouds the entirety star wheel 18, and the majority of pocket wheel 20. Face plate 56 is positioned parallel to a supporting plate 58 that as illustrated comprises a primary vertical support wall of apparatus 10. Shafts 48 and 50 are journaled in face plate 56, and in the case of shaft 48, may extend into similar relationship with supporting plate 58. One or more struts such as strut 60 are provided to brace face plate 56 against supporting plate 58.

Star wheel assembly as illustrated in FIG. 1, is disposed with pocket wheel 20 lying in tangential eccentric relation with respect to mandrel wheel 28. The exact positioning of pocket wheel 20 and star wheel 18 in relation to mandrel wheel 28 may vary, so long as the receptacles defined by cradles 22 and 24 coincide in alignment with each other and with consecutive mandrel assemblies 30. Thus, for example, both star wheel 18 and pocket wheel 20 might be positioned with their shafts 48 and 50 lying on the circumference of mandrel wheel 28, so long as the receptacle formed by respective cradles 22 and 24 coincides serially with the positioning of the individual mandrels. While the foregoing variant is not illustrated, it is to be considered within the scope of the present invention.

OPERATION

Figure 4A:
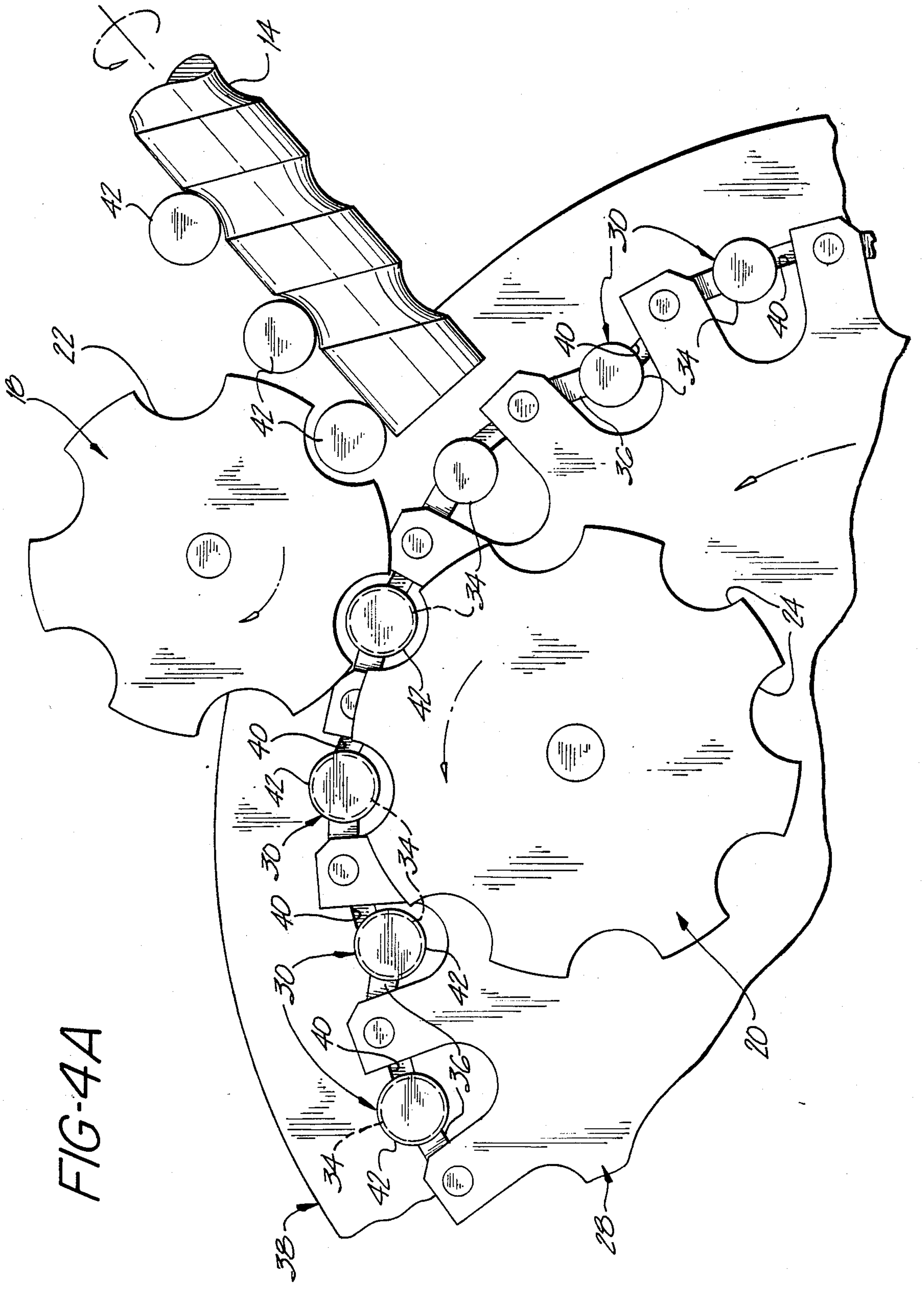
FIGS. 4A and 4B are enlarged and greater detailed views illustrating the operation of the infeed system of the present invention.

Referring to FIG. 4A, a plurality of containers 42 are moved downward along feed screw 14 toward star wheel assembly 16. The front-most container 42 moves into position within cradle 22, where it is brought along by the clockwise rotation of star wheel 18. Adjacent the tangent line between star wheel 18 and pocket wheel 20, cradles 22 and 24 move into juxtaposition to each other, and close around container 42, now residing within the cradle of pocket wheel 20. At the same time, mandrel wheel 28, shown fragmentally, is moving counterclockwise to place a mandrel assembly 30 in axial alignment with container 42, to enable the transfer of the container to the mandrel to occur. The next counterclockwise adjacent mandrel assembly 30 and corresponding cradle 24 remain in alignment to assure sufficient opportunity for the transfer to take place faultlessly.

Figure 4B:
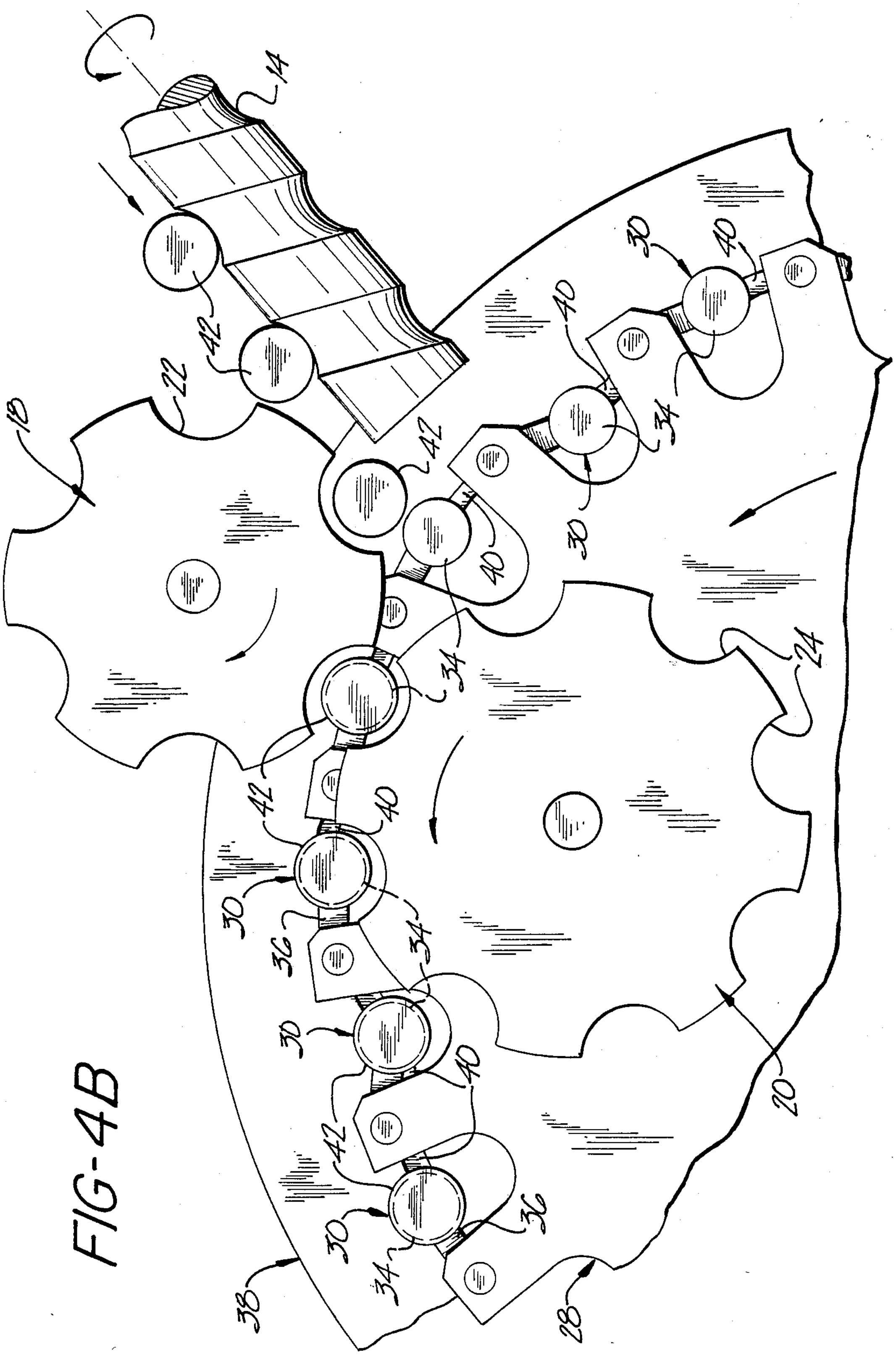

Referring now to FIG. 4B, star wheel 18 and pocket wheel 20 have rotated so that cradles 22 and 24 are in full juxtaposition to each other, so that a complete receptacle is formed to hold container 42. Mandrel wheel 28 has likewise rotated so that a mandrel assembly 30 is now in axial alignment with the receptacle defined by cradles 22 and 24, and container 42 may now be transferred thereto. Following mandrel wheel 28 counterclockwise, the mandrels bearing containers 42 can be seen moving away in alignment with pocket wheel 20, as previously mentioned; thereafter, the mandrel assemblies 30 move radially outward and away from pocket wheel 20, toward the subsequent operations performed by apparatus 10. Transfer of the containers 42 to the mandrels 34 is generally accomplished by vacuum suction means, not shown, provided within mandrels 34 in a manner conventional in the art.

Referring again to FIG. 1, containers 42 mounted on mandrels 34 are moved into surface contact with a continuously rotating image-transfer mat or blanket designated schematically at 43, that forms a part of the printing station of apparatus 10. Thereafter, containers 42, remaining on mandrels 34, are rotated away from the printing station and are given a coating of varnish, by means of peripheral surface engagement with a varnish applicator roll 44 that forms a part of the varnishing station of assembly 10.

After the printing and varnishing operations have been completed, containers 42 are rotated away from the varnishing station, and are transferred by means such as vacuum suction, to a transfer wheel generally designated 46. Transfer wheel 46 rotates containers 42 into juxtaposition with a series of spaced-apart pins, not shown, that are disposed on a chain-type output system 47 that carries the containers 42 through a curing oven, also not shown.

The conveyor assembly may be constructed from materials, including metals and appropriate resinous materials, known in the art for use in the construction of machinery of this type. The invention is therefore not limited to the construction of its component parts by a particular material, but rather encompasses all known materials within its scope.

As noted earlier, the employment of the reduced diameter pocket wheel facilitates greater accessibility of the mandrel assembly both during the operation of the machine, and in the instance where repairs must be effected. The removal of misfed containers is likewise facilitated.

While there have been herein shown and described the preferred embodiment of the present invention, it will be understood that the invention may be embodied otherwise than as herein specifically illustrated or described, and that within such embodiment certain changes in the detail and construction, and the form and arrangement of the parts may be made without departing from the underlying idea or principles of the invention within the scope of the appended claims.

What is claimed is:

1. An infeed transfer system for a continuously operated container decorating apparatus comprising:
   A. a mandrel wheel assembly comprising:
      a rotatable mandrel wheel,
      a plurality of regularly spaced mandrel assemblies pivotally mounted on said mandrel wheel, and
      a box cam guide means communicating with said mandrel assemblies at one end thereof, for guiding the path of movement of said mandrel assemblies during the rotation of said mandrel wheel; and
   B. a pocket wheel defining a plurality of cradles for the reception and support of said containers, eccentrically mounted adjacent said mandrel wheel, wherein said pocket wheel has a diameter smaller than that of said mandrel wheel, and said cradles are fewer in number than said mandrel assemblies;
   C. said box cam guide means defines a path causing each of said mandrel assemblies to follow the circumferential periphery of said pocket wheel in alignment therewith through an arc of rotation to facilitate the transfer of containers carried by said pocket wheel, to said mandrel assemblies;

D. wherein said smaller diameter pocket wheel simplifies the inspection and maintenance of said mandrel wheel assembly, by offering greater accessibility to said mandrel wheel and said mandrel assemblies, to effect repairs thereof and to remove misfed containers therefrom.

2. The infeed transfer system of claim 1 wherein said pocket wheel has a diameter one half the size of the diameter of said mandrel wheel.

3. The infeed transfer system of claim 1 wherein said box cam guide means comprises a stationary planar box cam disposed in spaced apart axial relation to said mandrel wheel, and a box cam track defined in one broad surface of said box cam, said mandrel assemblies are essentially cylindrical and define cam roller ends, said cam roller ends received within said box cam track, wherein said box cam track defines an undulation in its path corresponding in curvature to the circumferential periphery of said pocket wheel through said arc of rotation, to enable said mandrel assemblies to reside in axial alignment with the path of rotation of said pocket wheel for a period of time sufficient to transfer said containers to said mandrel assemblies.

4. The infeed transfer system of claim 2 wherein said undulation causes said mandrel assemblies to reside in axial alignment with said cradles through said arc of rotation.

5. The infeed transfer system of claim 3 wherein at least two consecutive mandrel assemblies may reside simultaneously in axial alignment with corresponding consecutive cradles of said pocket wheel within said arc of rotation.

6. The infeed transfer system of claim 1 wherein said arc of rotation is subtended by an acute angle.

7. The infeed transfer system of claim 6 wherein said acute angle is determined with reference to the axis of rotation of said mandrel wheel.

* * * * *